US009892715B2

(12) United States Patent
Komulainen et al.

(10) Patent No.: US 9,892,715 B2
(45) Date of Patent: Feb. 13, 2018

(54) ROTATING DISPLAY

(71) Applicant: Polar Electro Oy, Kempele (FI)

(72) Inventors: Olli Komulainen, Oulu (FI); Lauri Lumme, Oulu (FI)

(73) Assignee: POLAR ELECTRO OY, Kempele (FI)

( * ) Notice: Subject to any disclaimer, the term of this patent is extended or adjusted under 35 U.S.C. 154(b) by 41 days.

(21) Appl. No.: 14/751,880

(22) Filed: Jun. 26, 2015

(65) Prior Publication Data
US 2016/0379604 A1 Dec. 29, 2016

(51) Int. Cl.
  *G09G 5/38* (2006.01)
  *G06F 3/0489* (2013.01)
  *G06F 3/0488* (2013.01)
  *G06C 3/00* (2006.01)
  *G06F 1/16* (2006.01)
  *G06F 3/0362* (2013.01)
  (Continued)

(52) U.S. Cl.
  CPC ............... *G09G 5/38* (2013.01); *G04C 3/001* (2013.01); *G04G 17/045* (2013.01); *G04G 21/025* (2013.01); *G06F 1/163* (2013.01); *G06F 3/016* (2013.01); *G06F 3/0227* (2013.01); *G06F 3/0346* (2013.01); *G06F 3/0362* (2013.01); *G06F 3/0488* (2013.01); *G06F 3/04842* (2013.01); *G06F 3/04847* (2013.01); *G06F 3/04897* (2013.01); *G06T 3/60* (2013.01); *G06F 2200/1614* (2013.01); *G09G 2340/0492* (2013.01); *G09G 2354/00* (2013.01)

(58) Field of Classification Search
  None
  See application file for complete search history.

(56) References Cited

U.S. PATENT DOCUMENTS 6,968,508 B2 * 11/2005 Lucaci .................. G06F 1/1626
                                                     715/784
2004/0021702 A1    2/2004 Lucaci et al.
(Continued)

FOREIGN PATENT DOCUMENTS

EP        1056260 A2    11/2000

OTHER PUBLICATIONS

Patently Mobile, "Samsung Reveals New Circular Interface Smartwatch with Rotating Ring Controller, 3 Gesture Levels, new Charger & More", Jun. 1, 2014.*
(Continued)

*Primary Examiner* — Mark Zimmerman
*Assistant Examiner* — Yu-Jang Tswei
(74) *Attorney, Agent, or Firm* — Hoffman & Baron, LLP

(57) ABSTRACT

An apparatus includes a housing and a fixing mechanism configured to attach the housing to an object. The housing includes a display device and at least one processor configured to receive measurement data in a measurement mode during a physical exercise, to process the received measurement data, thus generating exercise data characterizing the exercise, and to display the exercise data through the display device during the physical exercise. The display device is configured to provide a plurality of display view orientations associated with different rotation angles between a first display view orientation, defined by attachment of the fixing mechanism to the object, and a 90-degree rotation from the first display view orientation. At least one function of the processor is associated with the rotation of the display view.

18 Claims, 7 Drawing Sheets

(51) Int. Cl.
*G06F 3/01* (2006.01)
*G06F 3/02* (2006.01)
*G06F 3/0346* (2013.01)
*G06F 3/0484* (2013.01)
*G06T 3/60* (2006.01)
*G04G 17/04* (2006.01)
*G04G 21/02* (2010.01)
*G04C 3/00* (2006.01)

(56) References Cited

U.S. PATENT DOCUMENTS

| | | | |
|---|---|---|---|
| 2010/0321899 A1* | 12/2010 | Vossoughi | B60R 11/02 361/728 |
| 2012/0242626 A1 | 9/2012 | Hu | |
| 2013/0120459 A1* | 5/2013 | Dickinson | G06F 1/163 345/650 |
| 2013/0222270 A1 | 8/2013 | Winkler et al. | |
| 2015/0029829 A1* | 1/2015 | Spadini | G04G 9/0082 368/226 |
| 2015/0049037 A1 | 2/2015 | Vincent et al. | |
| 2015/0358043 A1* | 12/2015 | Jeong | H04B 1/385 455/411 |
| 2015/0362998 A1* | 12/2015 | Park | G06F 3/017 345/173 |
| 2016/0091867 A1* | 3/2016 | Mansour | G04G 21/08 368/294 |

OTHER PUBLICATIONS

DC Rainmaker, "Garmin Fenix2 Multisport Watch In-Depth Review",—Mar. 29, 2014.*

Yu-Cheng Lee, Chung-Ying Yeh, U.S. Appl. No. 62/141,263, filed Apr. 1, 2015.*

European Search Report for corresponding European Application No. EP16175601, pp. 1-2, dated Nov. 14, 2016.

* cited by examiner

MECHANIC ROTATION OF BEZEL & SOFTWARE ROTATION FOR DISPLAY

HAPTIC BEZEL & SOFTWARE ROTATION FOR DISPLAY

US 9,892,715 B2

ROTATING DISPLAY

BACKGROUND

Field

The present invention relates to portable electronic devices equipped with a user interface comprising a display.

Description of the Related Art

Training computers may include, among other devices, wrist computer and bike computers. A problem with both computers is that, when attached and used during a physical exercise, their inherent fixing location is such that a display is not typically aligned with the user's eyes. When running, the user has to turn the hand holding the wrist computer in order to look at the display, thus breaking the running technique. When cycling, the bike computer is typically fixed to a crossbar of the bicycle on the left-hand side or the right-hand side of the crossbar and the display is not oriented towards the user.

SUMMARY

The invention is defined by the subject-matter of the independent claims.

Embodiments are defined in the dependent claims.

BRIEF DESCRIPTION OF THE DRAWINGS

In the following the invention will be described in greater detail by means of preferred embodiments with reference to the attached [accompanying] drawings, in which.

DETAILED DESCRIPTION

Figure 1:
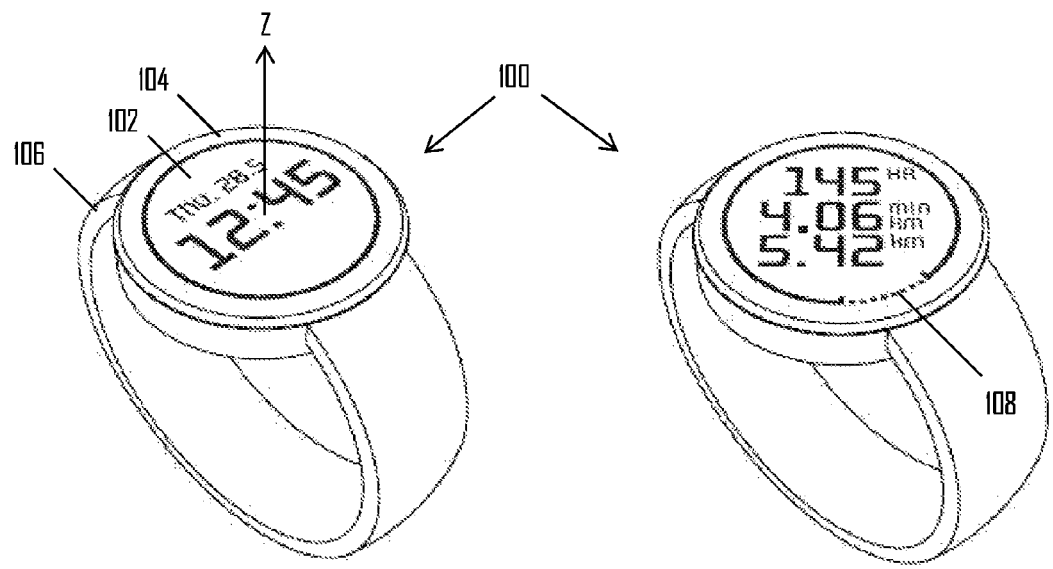
FIG. 1 illustrates an apparatus configured to provide a display view orientation according to an embodiment of the invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments of the invention relate to an apparatus attachable to an object such as a human body or a device. Some embodiments encompass the apparatus as a training computer configured to carry out measurements during a physical exercise performed by a user. The training computer may be attached to the user's body or to training equipment such as a bicycle or a gym device. Such embodiments may employ the training computer to measure physiological training data from the user's performance during the physical exercise and to output the training data to the user via a user interface of the training computer and/or via a user interface of another apparatus. The training computer may employ one or more biometric sensors, one or more motion sensors, and/or other sensors suitable for carrying out measurements during the physical exercise. One example of the biometric sensor is a heart activity sensor. Examples of the motion sensor include acceleration sensor configured to measure acceleration along one, two, or three perpendicular directions, a satellite positioning receiver configured to measure position and/or speed, a gyroscope configured to measure rotational motion, and a magnetometer configured to measure motion on the basis of magnetic field measurements. In the context of motion sensor, a sensor fusion may be employed, wherein the sensor fusion is a combination of a three-dimensional accelerometer, a gyroscope, and a magnetometer. Sensor data measured by the sensor fusion may be combined to improve the accuracy of the motion sensing.

Some embodiments of the invention relate to an apparatus arranged to be attached to the object. Such an apparatus may comprise an attachment structure designed and arranged to receive the training computer in a fixed, integrated, or detachable manner and to attach the training computer to the object. The attachment may be realized by a band that may be designed to encircle the object such that the band is attached around the object. The band may comprise locking parts at ends of the band where the locking parts form mutually counterparts such as a buckle and a catch. The locking parts may fix the band around the object as is commonly known in the field of wristwatches, wrist computers etc. In other embodiments, the attachment structure may be arranged to attach the apparatus to the device such as the bicycle. In such embodiments, the apparatus may be or may be comprised in a bike computer, for example.

As described in Background, conventional solutions of training computers do not typically provide the display view orientation which is aligned with the user's eyes and, therefore, the user has to manually bring the training computer into alignment with his/her eyes or try to read display contents from misaligned orientation. Referring to FIG. 1, let us describe an embodiment of the apparatus 100. The apparatus 100 comprises a housing 104 and a fixing mechanism 106 configured to attach said housing 104 to an object. The housing 104 comprises a display device 102 and at least one processor 12 configured to receive measurement data in a measurement mode during a physical exercise, to process the received measurement data and acquire, as a result of the processing, exercise data and to display the exercise data through the display device 102 during the physical exercise. The display device 102 is configured to provide a plurality of display view orientations associated with different rotation angles between a first display view orientation and a 90-degree rotation from the first display view orientation. At least one function of the processor 12 is associated with rotation of the display view.

In the embodiment of FIG. 1, the display view on the right hand side is rotated about 45 degrees with respect to the display view on the left hand side. The rotation is visualized by the dashed lines 108. The left hand side of FIG. 1 may represent the display view orientation in a default mode of the apparatus, e.g. an idle mode, while the right hand side may represent the display view orientation in another mode, e.g. the measurement mode.

Providing multiple display view orientations within the 90-degree rotation enables the device to adapt the display view to various situations which improves usability of the apparatus and user experience. It should be appreciated that the apparatus may provide another set of multiple display view orientations outside the above-mentioned 90-degree rotation. The definition of the 90 degrees should be understood as to define that the present invention is capable of adapting the display view to various orientations of the apparatus such that the user may conveniently check the display screen during the physical exercise.

In an embodiment, the plurality of the display view orientations include neither one of the first display view orientation and a second display view orientation that is the 90-degree rotation from the first display view orientation.

In an embodiment, the number of the display view orientations is sufficiently high to provide substantially continuous rotation of the display view between the first display view orientation and the second display view orientation. Of course, with the display devices based on a grid of pixels the rotation may not be continuous in a very strict sense. However, the wording substantially continuous may be considered such that the user experiences the rotation as continuous. In another embodiment, the number of the display view orientations between the first and the second display view orientation is less than ten or even less than five such that the rotation is gradual.

Figure 2:
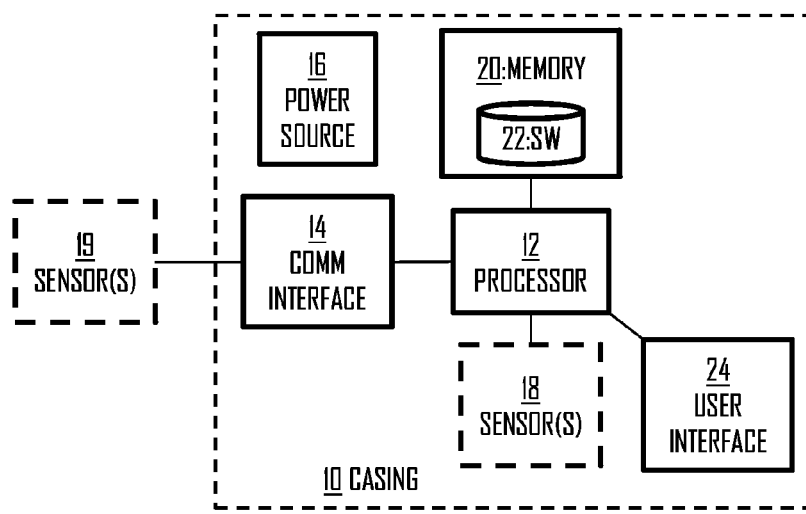
FIG. 2 illustrates a block diagram of a structure of the apparatus according to an embodiment of the invention.

Let us now describe an embodiment of the apparatus with reference to FIG. 2. FIG. 2 illustrates an embodiment of structural components of the apparatus. At least some of the structural components may be provided in the same casing 10 or, in some embodiments, all the components of the apparatus are provided in the same casing 10. The apparatus may comprise a power source 16 which may provide the apparatus with electric power supply. The power source 16 may comprise a battery.

The apparatus may further comprise at least one processor 12 or a processing circuitry configured to control the operations of the apparatus. The operation of the processor 12 may be defined by one or more computer program modules 22 stored in a memory 20 of the apparatus. Upon reading a computer program module from the memory 20, the processor 12 may execute a computer process comprising technical functions defined by the computer program module. At least some of the technical functions may comprise controlling the display device to carry out the rotation of the display view orientation and/or carrying out a function upon detecting the rotation of the display view orientation, as described in greater detail below. The memory 20 may further store measurement data acquired during the operation of the apparatus. The measurement data may comprise biometric measurement data and/or measurement data acquired during a physical exercise performed by the user of the apparatus. The measurement data may be acquired when the processor 12 operates in a measurement mode. In an embodiment, the processor is a graphics processing unit (GPU) configured to control creation of images in a frame buffer intended for output to a display on the display device. The apparatus may then comprise a second processor to analyze the measurement data, for example.

The apparatus may in some embodiments comprise at least one sensor device 18. The sensor device 18 may comprise any one of the following sensors: a heart activity sensor, an optical heart activity sensor, a blood pressure sensor, a motion sensor, and a pulse oximetry sensor. The optical heart activity sensor may be based on measuring a photoplethysmogram from the user's skin. The motion sensor may be any one or more of the above-described motion sensors. In some embodiments, the apparatus is connected to one or more biometric sensors 19 that are external to the casing. The processor 12 may communicate with the external biometric sensor(s) 19 in a wired or wireless manner. For example, the casing 10 may house a communication interface 14 to carry out the communications between the processor and the external sensor(s). The communication interface 14 may comprise wireless communication circuitry configured to communicate with a counterpart wireless communication circuitry of the biometric sensor(s) 19 according to a wireless communication protocol such as Bluetooth® or Bluetooth Smart. In some embodiments, the communication interface 14 comprises a communication circuitry configured to support a wired communication protocol and a connector of a wired connection, e.g. universal serial bus (USB).

The apparatus may further comprise a user interface 24. The user interface 24 may comprise one or more user input devices in the form of one or more buttons and/or a touch-sensitive display. The user interface 24 may comprise one or more user output devices such as the display device 102 comprising a display screen, for example. The display screen may be realized according to the state-of-the-art technology, such a liquid crystal display (LCD) screen or a light emitting diode (LED) display screen. The output devices may further include a loudspeaker.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory (memories) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, an integrated circuit or applications processor integrated circuit for a training computer.

Let us now describe some embodiments of the apparatus of FIG. 1 with respect to the rotation of the display view orientation and associated function of the processor.

Figure 3:
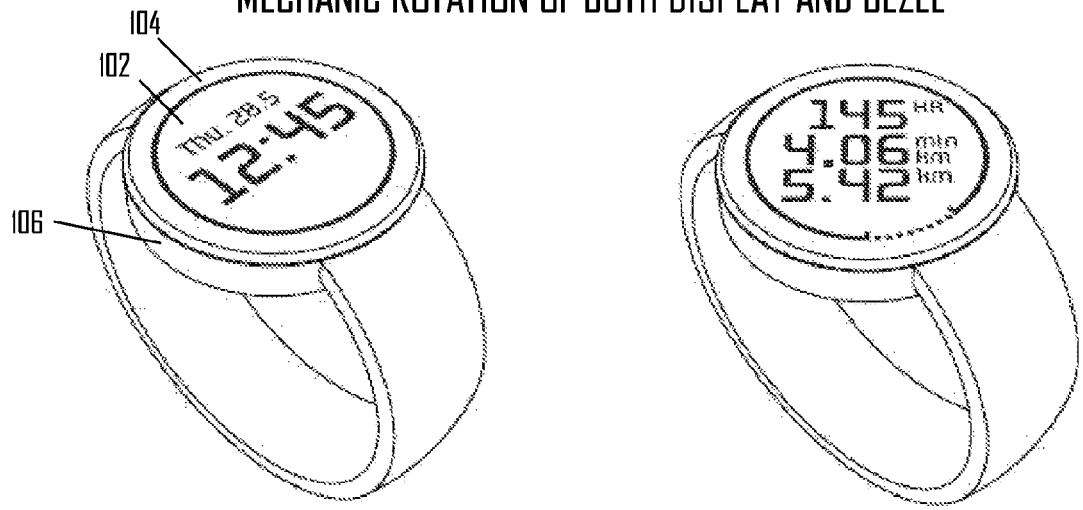
FIG. 3 illustrates an embodiment of the apparatus where a display device is configured to rotate mechanically.

FIG. 3 illustrates an embodiment where the display device 102 is attached to a rotating mechanism 104 configured provide a mechanic rotation of the display device 102 with respect to a hull of the apparatus to each of the plurality of display view orientations. The casing 10 may comprise the hull housing the processor 12 and the communication interface 14, for example, while the display device 102 may be attached to the hull with the rotating mechanism 104. The rotating mechanism 104 may comprise a bezel around the display, as illustrated in FIG. 3. The bezel may be fixed to the display device 102. The rotating mechanism 104 may be realized with a mechanic interaction of two components such that the components are rotatable with respect to each other but remain attached to each other. This may be realized with conventional designs of material and mechanical dimensions and forms of counterparts of the rotating mechanism 104 in the hull and the bezel of the display device.

Figure 4:
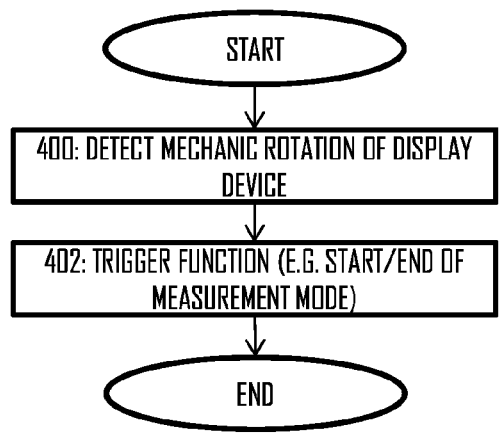
FIG. 4 illustrates a function associated with the mechanical rotation according to an embodiment of the invention.

Referring to FIG. 4, the at least one function of the processor 12 associated with the rotation of the display device 104 is responsive to a change in the mechanic display view orientation of the display device 104. The rotating mechanism may be an electro-mechanic mechanism in the sense that the mechanic rotation of the display device causes an electric output to the processor 12. This may be realized in various manners, e.g. by using small magnets in the bezel and in the hull at the corresponding locations, wherein motion of the bezel causes a change in a magnetic field and induction of electric current in a signal line that may be directed to the processor 12. Each display view orientation may be arranged to induce a different electric current through proper arrangement of the magnets. Another example by employs electric signal lines in the rotating mechanism such that a certain display view orientation of the display device 102 short-circuits a certain signal line, thus causing the electric output via the certain signal line to the processor 12. Still another embodiment employs a stripline resonator or another resonator configured to change its resonance frequency in response to the rotation of the bezel with respect to the hull. The resonance frequency of the resonator may be measured by a measurement circuitry, and the measured resonance frequency may be input to the processor 12. The processor may then map the resonance frequency to an orientation of the bezel with respect to the hull. Yet another embodiment employs a resistor strip arranged at the location of the bezel in the hull, and the bezel contains an electric contact point contacting in an electrically conductive manner the resistor strip at a certain point of the resistor strip. The contact point may move according to the rotation of the bezel and cause the effective resistance of the resistor strip to change. The processor may measure the resistance of the resistor strip and determine the orientation of the bezel from the measured resistance. Accordingly, the processor 12 is capable of processing the electric outputs received from the rotating mechanism and to perform the function. In some embodiments, the processor needs only to detect a change in the display view orientation without the need for determining the actual display view orientation. In block 400, the processor detects the mechanic rotation of the display device, for example on the basis of an electric signal responsive to the mechanic rotation of the display device 102. In block 402, the processor triggers a function in response to the detection of the mechanic rotation of the display device 102. In an embodiment, the processor triggers a change from an idle mode to a measurement mode in block 402 in response to the detected mechanic rotation of the display device 102. In another embodiment, the processor triggers a change from the measurement mode to the idle mode in block 402 in response to the detected mechanic rotation of the display device 102. In such embodiments, the user may start the measurement mode simply by mechanically bringing the display device to a display view orientation that is suitable for viewing the display device during a physical exercise, e.g. the orientation displayed on the right hand side of FIG. 3. Similarly, user may end the measurement mode simply by mechanically bringing the display device to a default display view orientation, e.g. the orientation displayed on the left hand side of FIG. 3. The rotation of the display view thus functions as a switch between two operational modes of the apparatus, e.g. the idle mode and the measurement mode. In other embodiments, the rotation of the display view functions as the switch between two other operational modes of the apparatus, e.g. idle mode and a music playback mode.

In the embodiments of FIGS. 3 and 4, the display device may be mechanically rotatable such that the display screen itself actually rotates between the display view orientations in response to a mechanical input from the user, for example. In some embodiments, the processor 12 may control the mechanical rotation of the display device by employing an electric motor or actuator controlling the rotation. In these embodiments, the function of the processor is responsive to the mechanical rotation of the display device 102.

In some other embodiments described below, the at least one function of the processor 12 associated with the rotation of the display device 102 is selecting, by the processor 12, one of the plurality of display view orientations in response to an input and controlling, by the processor 12, the display device 102 to provide display content in the selected display view orientation. In the following embodiments, the display view orientations may be realized by maintaining the display device physically in the same orientation and rotating the display view by the processor. This may be carried out by rotating the display content displayed on the display screen in a software process where the processor 12 controls the pixel values of the display screen.

Figure 5:
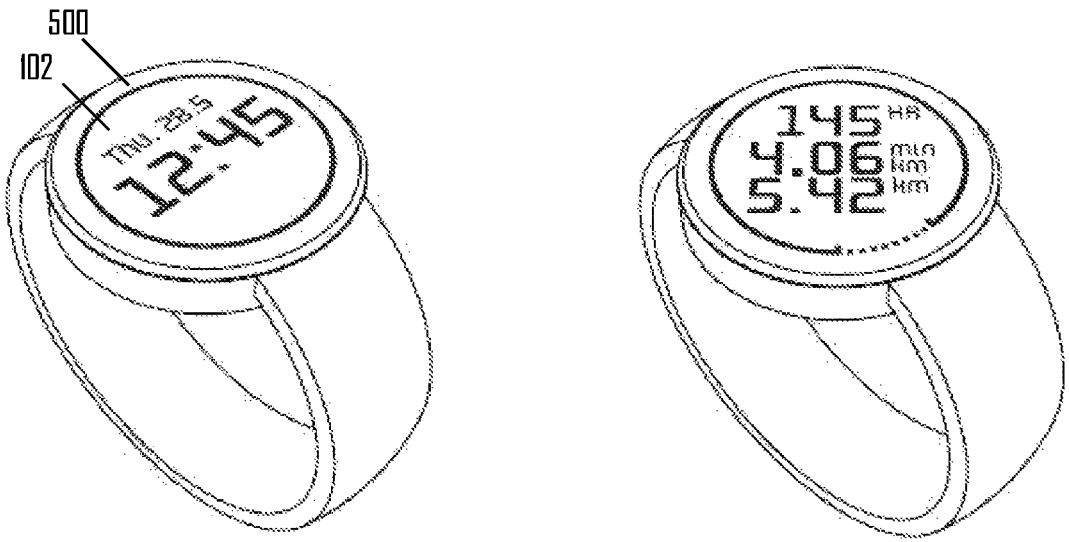
FIG. 5 illustrates an embodiment of the apparatus where a bezel around the display device is configured to rotate mechanically and display content is rotated through a computer process according to an embodiment of the invention.

In the embodiment of FIG. 5, a mechanic bezel 500 is provided around the display device 102, wherein the bezel 500 is mechanically rotatable about the display device 102. Such a bezel has been used in some wristwatches. The bezel may be detached from the display device 102 such that the display device does not rotate together with the bezel. The bezel 500 may communicate electrically with the processor 12 such that the processor 12 is capable of detecting the rotation and orientation of the bezel with respect to a reference orientation. A few solutions to realize the electrical interaction between the rotating bezel 500 and the processor 12 are described above. The electrical interaction enables the processor 12 to determine the orientation of the bezel 500 and to adapt the display view orientation to the orientation of the bezel 500.

Figure 6:
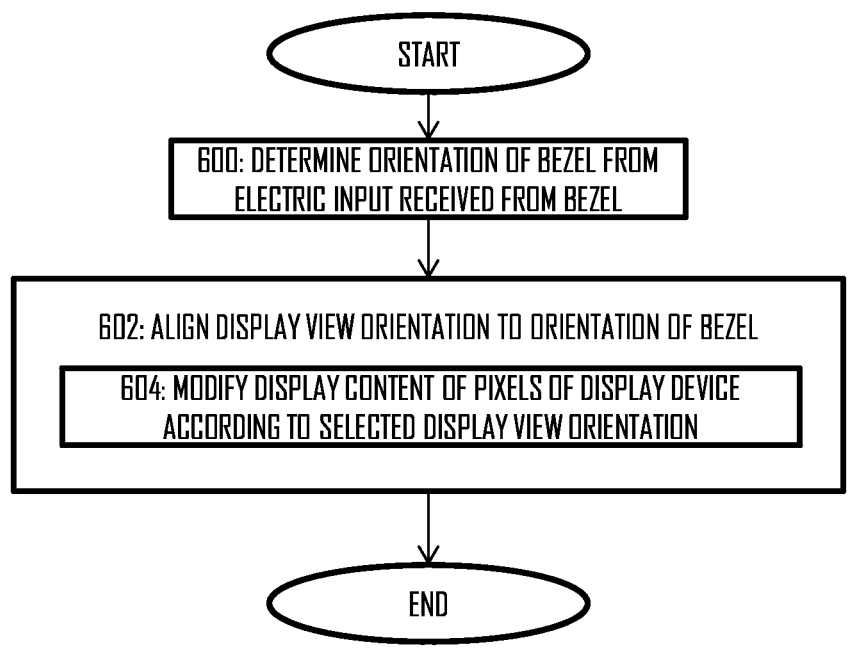
FIG. 6 illustrates an embodiment of said computer process.

In the embodiment of FIG. 6, the processor 12 aligns the display view orientation to the orientation of the bezel 500. Referring to FIG. 6, the processor 12 determines in block 600 the orientation of the bezel from one or more electric inputs caused by the mechanical displacement of the bezel 500 from the reference orientation to another orientation. In block 602, the processor selects a display view orientation for the display content displayed on the display device according to the determined orientation of the bezel 500. The processor may select the same orientation for the display view as was determined for the orientation of the bezel. The alignment of the display view orientation to the orientation of the bezel 500 may be realized by modifying pixel values of the display device such that the display view is rotated to the correct orientation (block 604).

In an embodiment, the process of FIG. 6 is performed by the processor substantially in real time. For example, upon detecting a motion of the bezel 500, the processor may immediately adapt the display view to the new orientation. Accordingly, the user sees the response to the mechanic input to the bezel 500 immediately as the realignment of the display view.

Figure 7:
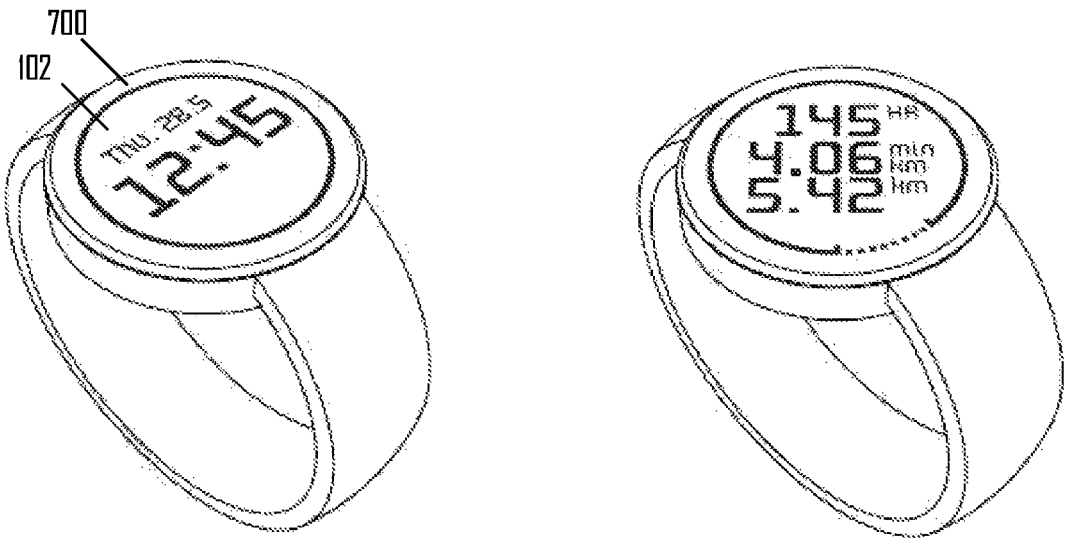
FIG. 7 illustrates an embodiment employing a haptic bezel.
Figure 8:
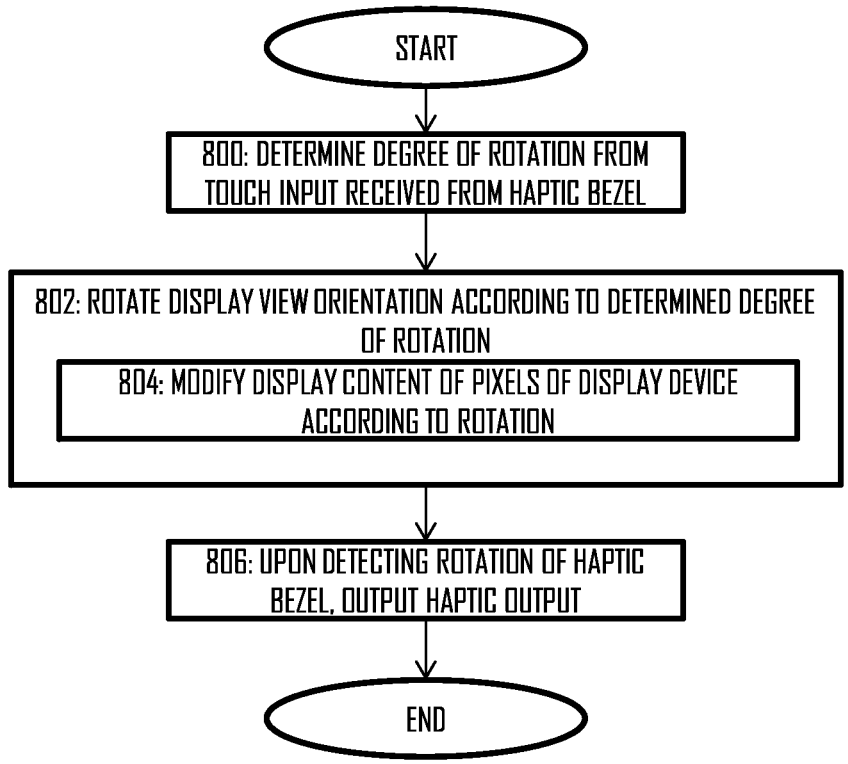
FIG. 8 illustrates an embodiment of a computer process mapping haptic inputs into rotation of display content.

FIG. 7 illustrates an embodiment where a touch-sensitive element 700 is provided around the display device 102, wherein the annular element 700 provides for a virtual bezel capable of detecting haptic inputs from the user. The processor 12 may then interpret the haptic inputs as the rotation of the virtual bezel and adapt the display view orientation to the detected rotation. FIG. 8 illustrates an embodiment of the process for aligning the display view orientation to the detected user input indicating the rotation of the haptic bezel. Referring to FIG. 8, upon detecting a haptic input from the user to the touch-sensitive element of the haptic bezel, the processor 12 may be configured to determine the degree of rotation of the display view orientation from the haptic input in block 800. In an embodiment, the processor is configured to determine the length of a haptic swipe input on the touch-sensitive element. The length may be determined in degrees from the starting point of the haptic swipe input on the touch-sensitive element to an end point of the haptic swipe input on the touch-sensitive element. The length may then be mapped to a certain degree of rotation according to a mapping table mapping different lengths of the swipe input to the different degrees of rotation of the display view orientation.

Upon determining the degree of rotation, the processor may rotate the display view orientation according to the determined degree of rotation in block 802. The rotation may be carried out by controlling the display device to rotate the display contents of the pixels in the above-described manner without mechanically rotating the display device (block 804).

In an embodiment where the haptic bezel is annular, the degree of rotation of the display view orientation may be equivalent to the degree of the haptic swipe input on the touch-sensitive element. For example, if an angle between the start point and the end point of the swipe input on the haptic bezel is 45 degrees, the angle counted from a centre of the annulus of the bezel, the processor may rotate the display view 45 degrees to the same direction as the direction of the swipe input.

In an embodiment, optional block 806 is executed where the processor causes a haptic output in response to the detection of the haptic input on the bezel. The haptic output may comprise a vibration output. The haptic output may indicate to the user that the apparatus has detected the haptic input.

In another embodiment employing haptic inputs, the display device comprises a touch-sensitive element, e.g. the display screen of the display device may be a touch-sensitive screen. The processor may determine the display view orientation from a touch swipe input detected by the touch-sensitive element. In an embodiment, the processor is configured to determine the display view orientation from the detected direction of the swipe input. In an embodiment, the processor determines a left-right direction of the display view orientation from the swipe input such that "left" of the display view orientation is where the swipe began and "right" of the display view orientation is where the swipe ended. Accordingly, the user may define the display view orientation of the display content by bringing his finger or stylus to the side of the screen where he wants "left" to be and make a swipe across the display screen towards the "right" direction.

Figure 9:
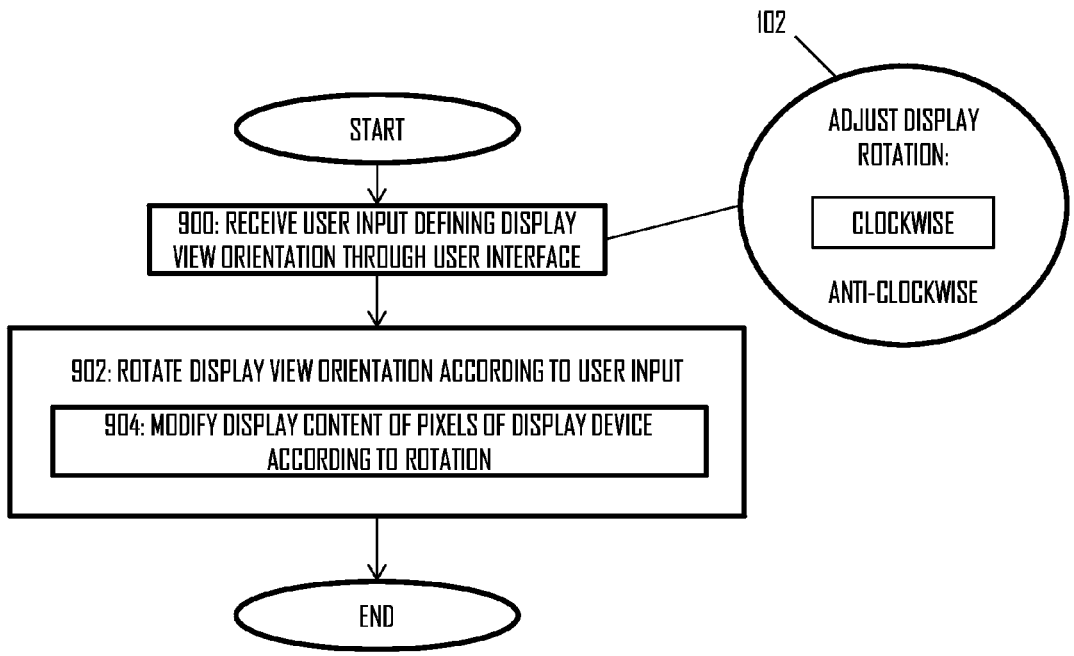
FIG. 9 illustrates an embodiment where a user input causes rotation of a display view.

Let us now describe some further embodiments of the input causing the change of the display view orientation. FIG. 9 illustrates an embodiment where the input is a user input. Above, some user inputs related to the use of the bezel have been described. In the embodiment of FIG. 9, the processor receives the user input defining a display view orientation through the user interface 24 of the apparatus, e.g. through one or more buttons of the user interface or the user operating a menu structure of the apparatus. Referring to FIG. 9, the processor receives a user input defining a display view orientation through the user interface 24 in block 900. As illustrated in FIG. 9, the apparatus may provide, as a feature, a function where the display view may be rotated according to the user inputs. In the embodiment illustrated in FIG. 9, the display screen 102 may provide the user with an option to select the direction of the rotation, e.g. clockwise and anti-clockwise options that are user selectable. Then, upon detecting the user pressing a selection button while the direction is being selected, the processor may be configured to rotate the display to the direction specified by the user input (block 902). As described above, the processor may rotate the display view orientation by rotating the display content without rotating the display device itself (block 904). The processor 12 may rotate the display view substantially in real time as the user provides the user input.

In another embodiment, the apparatus may comprise a rotatable knob that the user may rotate to provide the user input of block 900.

Figure 10:
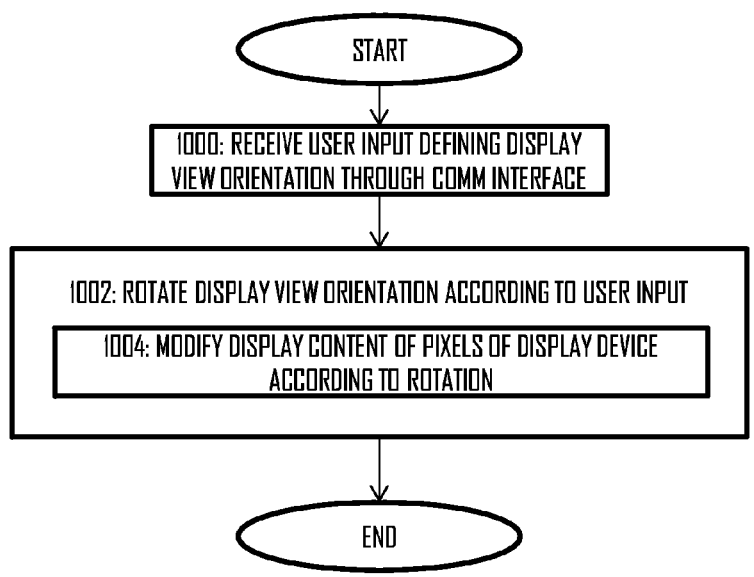
FIG. 10 illustrates another embodiment where the user input causes the rotation of the display view.

In the embodiment of FIG. 10, the processor 12 receives the user input defining the display view orientation through the communication interface 14 (block 1000). For example, the user may operate his/her smart phone or a computer connected to the apparatus in order to make the desired settings with respect to the display view orientation. The user inputs may then be communicated to the apparatus through the communication interface 14 and the processor may, upon receiving the user input in block 1000, rotate the display view orientation according to the received user input in blocks 1002, 1004.

In the embodiments of FIGS. 9 and 10, the user may select a display view orientation for one or more operational modes of the apparatus. The apparatus may provide a capability of associating a unique display view orientation to different operational modes. Upon receiving the user selection of the display view orientation for a given operational mode, the processor may store the display view orientation as associated to the operational mode and, when switching to the operational mode, the processor 12 may retrieve the associated display view orientation and implement the orientation.

In an embodiment, the user may select a display view orientation for a plurality of sub-modes within one operational mode such as the measurement mode. For example, the user may select a display view orientation per sports type. The apparatus may be attachable to different objects in connection with different sports types, e.g. to a wrist when running and to a bike when cycling. Therefore, provision of a preconfigured display view orientation per sports type provides easy adaptation of the display view orientation to the selected mode or sub-mode of the apparatus.

Figure 11:
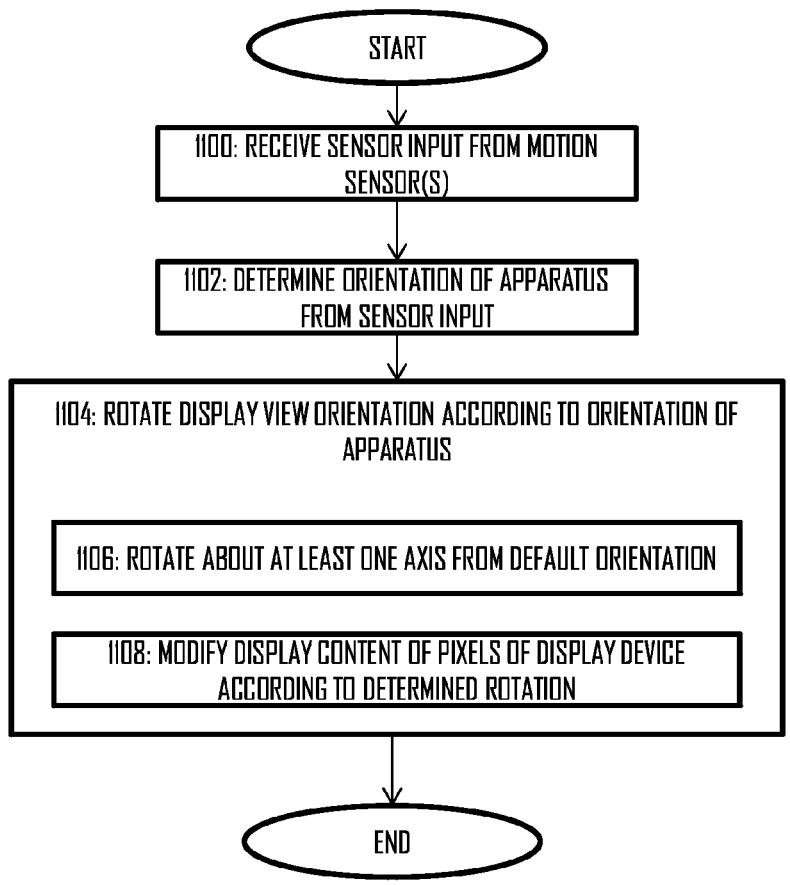
FIG. 11 illustrates an embodiment where a sensor input causes the rotation of the display view.

In an embodiment, the input causing the change of the display view orientation is a sensor input. FIG. 11 illustrates an embodiment of a process executed by the processor 12, in which the processor rotates the display view orientation upon detecting a sensor input indicating physical rotation of the apparatus. Referring to FIG. 11, the processor receives one or more sensor inputs from one or more motion sensor(s) comprised in the apparatus and/or connected to the apparatus in block 1100. The sensor input(s) represent the motion of the apparatus and/or the position of the apparatus. In block 1102, the processor determines the orientation of the apparatus from the sensor input. In some embodiments, block 1102 is omitted and the process may proceed from block 110 directly to block 1104. In block 1104, the processor selects a display view orientation on the basis of the received sensor input, e.g. according to the orientation of the apparatus determined in block 1102. Block 1104 may comprise causing rotation of the display view orientation about at least one axis of the apparatus (block 1106). The rotation may be carried out in the above-described manner by rotating the display content while the orientation of the display device follows the motion of the apparatus and is not rotated mechanically by the processor 12.

In an embodiment of the process of FIG. 11, the operation may be considered such that the processor maintains the display view orientation constant with respect to the user's eyes while the apparatus moves in response the user's motion during the physical exercise. The operation thus resembles the operation of a water scale, in a manner. Accordingly, the display view orientation may be maintained such that it is readable by the user without the need of changing the physical orientation of the apparatus. The operation also improves the readability of the display content in a case where the apparatus moves with respect to the user's eyes, e.g. in cycling or running. This feature may be realized by the processor determining, on the basis of the received sensor input, the degree of rotation of the apparatus about one or more perpendicular axes and rotating the display view orientation to the opposite direction by the same amount defined by the determined degree of rotation. This operation may be considered as dynamic rotation of the display view orientation on the basis of measured motion or motion vector.

In an embodiment, the casing 10 of the apparatus is detachably attached to an attachment structure such as a band or a strap. The casing the may be attachable to different types of attachment structures. The processor 12 may store a plurality of display view orientations such that a separate display view orientation is associated with each attachment structure. The processor may be able to identify the strap on the basis of wireless or wired communication with the attachment structure, e.g. via the communication interface 14. In an embodiment, the attachment structure comprises a readable tag such as a near field communications (NFC) tag storing an identifier of the attachment structure. Upon reading the identifier, the processor may retrieve from the memory 20 the display view orientation mapped to the identifier.

Figure 12:
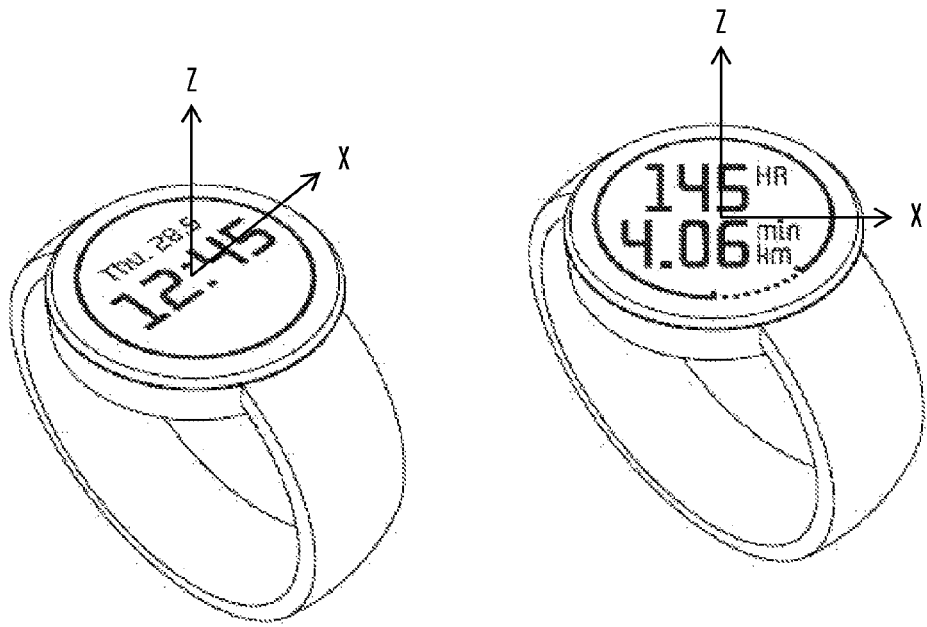
FIG. 12 illustrates rotation of the display view about one or a plurality of axes according to some embodiments of the invention.

In an embodiment, the plurality of display view orientations provide different rotations of the display view about an axis perpendicular to a plane formed by a display screen of the display device. FIG. 12 illustrates an embodiment of the apparatus where the axis perpendicular to the plane formed by the display screen of the display device is defined as Z axis. The rotation about the Z axis has also been illustrated in FIGS. 1, 3 and 5. This embodiment is applicable to all embodiments described above. For example, the user input may define the degree of rotation about Z axis, or the processor may employ the motion sensor(s) to determine the rotation of the apparatus about Z axis and to rotate the display view orientation about Z axis accordingly.

In an embodiment, the plurality of display view orientations provide different rotations of the display view about an axis parallel to a plane formed by a display screen of the display device. In an embodiment, the axis parallel to said plane is an axis along which text is displayed on the display device, e.g. an axis from left to right in terms of how text is readable on the display. In another definition of the axis, the axis is the left-to-right axis from the viewpoint of the user looking at the display device at any instant when the display content is aligned with the user's eyes. This axis is denoted in FIG. 12 by X axis. This X axis may rotate about the Z axis according to the selected display view orientation such that the rotation of the X axis follows the rotation of the display view orientation about the Z axis. Providing a plurality of display view orientations about the X axis enables compensation of perspective, for example, as illustrated on the right hand side Figure of FIG. 12. When the display device is inclined about X axis such that the Z axis is not directed towards the user, the user may still view the contents of the display as the text would be directed towards the user. The processor may carry out such perspective compensation by first defining a reference inclination angle about the X axis, where the Z axis is directed towards the user in the reference inclination angle. During use, the processor may determine, on the basis of any one of the above-described inputs, deviation from the reference inclination angle and perform the perspective compensation for the display content such that the display content is rotated about the X axis. The perspective compensation may comprise deforming the display content such that objects of the display content further away from the user as a result of the new inclination are widened and that objects of the display content closer to the user as a result of the new inclination are narrowed. This perspective compensation makes the objects displayed on the display device more readable to the user in a situation where the display device is inclined with respect to the user's eye of sight.

Figure 13:
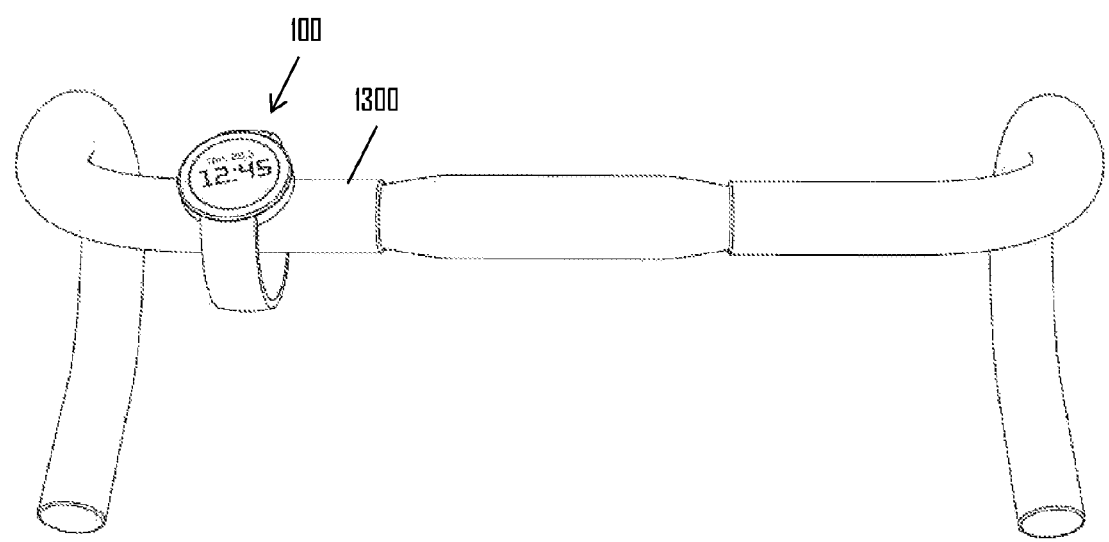
FIG. 13 illustrates an embodiment where the apparatus is a bike computer.

Above, the apparatus is described as comprising the casing 10 attachable to the attachment structure. In an embodiment, the apparatus is or is comprised in a wrist device comprising the casing 10 and the attachment structure in the form of a band that is designed to attach the casing to the user's wrist. In another embodiment, the apparatus is or is comprised in a bike computer comprising the casing 10 and the attachment structure designed to attach the casing 10 to a bar of a bicycle, e.g. a crossbar 1300 of the bicycle (see FIG. 13). Other embodiments of the bike computer comprise an attachment structure designed to attach the bike computer to another bar or another location in the bicycle. With the capability of selecting the display view orientation according to any one of the above-described embodiments, the display view may be adapted to various attachment locations such that the display view is aligned with the position of user's eyes with respect to the apparatus. Thus, readability of the display contents may be improved.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   a housing;
   a fixing mechanism configured to attach said housing to an object, the housing comprising a display device and at least one processor configured to receive measurement data in a measurement mode during a physical exercise, to process the received measurement data, thus generating exercise data characterizing the exercise, and to display the exercise data through the display device during the physical exercise; and a mechanical bezel provided around the display device and is separate therefrom, the mechanical bezel being mechanically rotatable about the display device wherein the display device mechanically rotates together with the bezel relative to the housing, wherein the display device is configured to provide a plurality of display view orientations associated with different rotation angles of the bezel between a first display view orientation, defined by attachment of the fixing mechanism to the object, and a 90-degree rotation from the first display view orientation, and wherein at least one function of the processor is associated with the rotation of the display view.

2. The apparatus of claim 1, wherein the display device is attached to the bezel, and the mechanically rotating bezel is configured to provide a mechanical rotation of the display device between the plurality of display view orientations.

3. The apparatus of claim 1, wherein rotation of the mechanic bezel switches the at least one function of the processor to a second function and wherein the second function is triggering a start of the measurement mode in the apparatus.

4. The apparatus of claim 1, wherein the at least one function of the processor associated with the rotation of the display device is selecting, by the processor, one of the plurality of display view orientations in response to an input and controlling, by the processor, the display device to provide display content comprising exercise data in the selected display view orientation.

5. The apparatus of claim 1, wherein rotation of the bezel provides an electric input serving as said input, and wherein the processor is configured to determine the position of the bezel on the basis of said electric input from the bezel and to select one of the display view orientations on the basis of the determined position of the bezel.

6. The apparatus of claim 4, wherein said input is a user input specifying one of the plurality of display view orientations and the processor is configured to cause the display device to display content in the specified display view orientation.

7. The apparatus of claim 6, wherein the user input is received through a user interface of the apparatus.

8. The apparatus of claim 6, wherein the user input is received from another apparatus through a communication interface.

9. The apparatus of claim 6, wherein the processor is configured to cause the display device to display the content in the specified display view orientation in the measurement mode, and to display content in another display view orientation when the apparatus is not in the measurement mode.

10. The apparatus of claim 4, further comprising a motion sensor, wherein the input is a sensor input from the motion sensor, and wherein the processor is configured to select one of the plurality of display view orientations on the basis of the sensor input.

11. The apparatus of claim 10, wherein the processor is configured to change, during physical motion of the apparatus, the display view orientation dynamically according to the measured motion defined by the sensor input.

12. The apparatus of claim 1, wherein the plurality of display view orientations provide different rotations of the display view about an axis perpendicular to a plane formed by a display screen of the display device.

13. The apparatus of claim 1, wherein the plurality of display view orientations provide different rotations of the display view about an axis parallel to a plane formed by a display screen of the display device.

14. The apparatus of claim 13, wherein the processor is configured to determine inclination of the display screen with respect to a reference inclination and to carry out perspective compensation for the display view according to the determined inclination.

15. The apparatus of claim 1, wherein the apparatus is a wrist computer configured to be attached to a user's wrist.

16. The apparatus of claim 1, wherein the apparatus is a bike computer configured to be attached to a bicycle.

17. The apparatus of claim 1, wherein the housing is detachably attachable to multiple fixing mechanisms of different types and associated with different display view orientations of the display device, wherein the at least one processor is configured to identify a fixing mechanism currently attached to the housing and to select a display view orientation associated with the fixing mechanism currently attached to the housing.

18. The apparatus of claim 1, wherein rotation of the mechanical bezel switches the apparatus from an idle mode to the measurement where the at least one processor receives the measurement data during the physical exercise.

* * * * *